United States Patent Office 3,555,067
Patented Jan. 12, 1971

3,555,067
ALPHA (SILYLMETHYL) SULFIDES AND THE CORRESPONDING SILOXANES
Gary E. Le Grow, Midland, Mich., assignor to Dow Corning Corporation, Midland, Mich., a corporation of Michigan
No Drawing. Filed Dec. 13, 1968, Ser. No. 783,749
Int. Cl. C07f 7/08, 7/10
U.S. Cl. 260—448.2           2 Claims

ABSTRACT OF THE DISCLOSURE

Bis- and tris-alpha-silyl sulfides of the formula

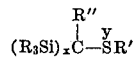

where $x$ is 2 or 3 and $y$ is 0 or 1, are prepared by the reaction

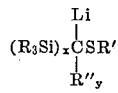

plus $R_3SiCl$. When at least one R is a silanol group or a hydrolyzable group the corresponding siloxanes are prepared by hydrolyzing and/or condensing such compounds. The compositions are useful as anti-oxidants and as lubrication additives.

---

This invention relates to compounds of the formula

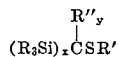

in which $x$ is an integer from 2 to 3 inclusive, $y$ is an integer from 0 to 1 inclusive, R is a hydrocarbon radical free of aliphatic unsaturation, hydrogen, OH or —$NX_2$ in which X is an alkyl radical, R″ is hydrogen or a hydrocarbon radical free of aliphatic unsaturation and R′ is an alkyl or a phenyl radical.

The silanes of this invention are prepared by reacting compounds of the formula $R_3SiCl$ with organolithium compounds of the formula

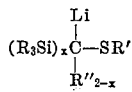

which in turn are prepared by the method disclosed in applicant's copending application Ser. No. 783,748 entitled "Organolithium Derivatives of Alpha-Silylmethyl Sulfides" filed concurrently herewith, the entire disclosure of which is hereby incorporated by reference.

The reaction of the chlorosilanes with the lithium derivatives is carried out in the normal manner for reacting chlorosilanes with organometallic compounds. These methods are well known in the art.

As stated above R can be a hydroxyl group. These silanols are prepared by careful hydrolysis of those silanes in which R is a $X_2N—$ group using an acid such as acetic acid as a catalyst. Silanols can also be prepared by reacting those silanes in which at least one R is hydrogen with water. The latter is best done in the presence of a palladium catalyst under neutral conditions as shown in U.S. Pat. 3,328,448.

This invention also relates to siloxanes having at least one unit of the formula

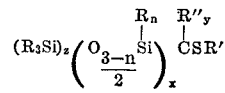

in which $x$ is an integer from 1 to 3 inclusive, $z$ is an integer from 0 to 2 inclusive, $y$ is an integer from 0 to 1 inclusive, the sum of $x+z$ being at least 2 and the sum of $x+y+z$ being no greater than 3, $n$ is an integer from 0 to 2, R is a hydrocarbon radical free of aliphatic unsaturation, a hydrogen atom, a hydroxyl group or a radical of the formula —$NX_2$ in which X is an alkyl radical, R″ is a hydrocarbon radical free of aliphatic unsaturation or a hydrogen atom, and R′ is an alkyl radical or a phenyl radical, any remaining siloxane units being of the formula

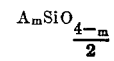

in which A is a hydrolyzable group, a hydrogen atom, a hydroxyl group, a hydrocarbon radical, or a halohydrocarbon radical and $m$ has an average value from 0 to 3 inclusive.

The siloxanes of this invention are prepared by conventional methods for preparing siloxanes. In other words, they are prepared by the hydrolysis and/or condensation of the above defined silanes in which R is a hydrolyzable or a condensable group. As is well known in the siloxane art for one to have uncondensed hydroxyl groups remaining in a siloxane, the condensation must be carried to a point short of complete condensation. In order to have hydrolyzable groups remaining in the siloxane, the hydrolysis must be carried out with insufficient water to react with all of the hydrolyzable groups. By selecting the proper ratio of R groups to silicon, siloxanes can be prepared in the form of fluids, resins or rubbers. Furthermore, they can be either homopolymers or copolymers of the various sulfur containing groups, or they can be copolymers of the siloxane units of this invention and conventional siloxane units of the type

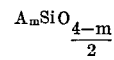

The characteristic and novel grouping of the compositions fo this invention is the group

In other words, one has at least two silicon atoms bonded to the same carbon atom, which carbon atom is also bonded to a sulfur atom of a sulfide group.

In those cases in which each silicon atom has at least one oxygen atom attached thereto, the basic configurations within the scope of this invention are as follows:

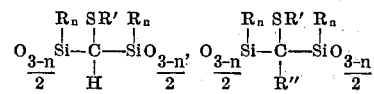

and

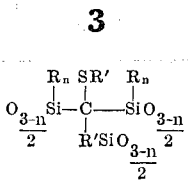

Of course, it is not necessary that each silicon have an oxygen atom attached thereto. In those cases the following configurations are obtainable:

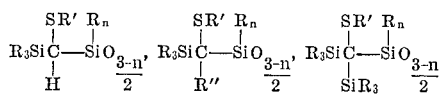

and

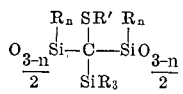

As has been mentioned the siloxanes containing the above sulfur groups can be copolymerized with siloxane units of the formula $A_mSiO_{4-m}$, such as $A_3SiO_{.5}$, $A_2SiO$, $ASiO_{3/2}$ and $SiO_2$.

For the purpose of this invention R can be any hydrocarbon radical free of aliphatic unsaturation such as alkyl radicals, such as methyl, ethyl, butyl, isobutyl, hexyl, octadecyl or myricyl; any aryl radical such as phenyl, xenyl, naphthyl or anthracyl; any alkaryl radical such as tolyl, xylyl, ethylphenyl, or isopropylphenyl and any aralkyl radical such as benzyl, beta-phenylethyl or beta-phenylpropyl.

R″ can be any hydrocarbon radical free of aliphatic unsaturation such as alkyl radicals such as methyl, ethyl, isobutyl, hexyl, myricyl; any aryl radical such as phenyl, xenyl, naphthyl or anthracyl; any alkaryl radical such as tolyl, xylyl or ethylphenyl or any aralkyl radical such as benzyl, beta-phenylethyl or beta-phenylpropyl.

X is any alkyl radical such as methyl, ethyl, isopropyl or octadecyl and R′ can be any alkyl radical such as those shown for X or the phenyl radical.

For the purpose of this invention A can be any hydrocarbon radical such as any alkyl radical such as methyl, ethyl, octadecyl, isopropyl or myricyl; any alkenyl radical such as vinyl, allyl, hexenyl or butadienyl; any cycloaliphatic hydrocarbon radicals such as cyclopentyl, cyclohexyl or cyclohexenyl; any aromatic hydrocarbon radical such as phenyl, xenyl, naphthyl, anthracyl, tolyl, xylyl or ethylphenyl; and any aralkyl radical such as benzyl, beta-phenylethyl or beta-phenylpropyl.

A can also be any halogenated hydrocarbon radical such as chloromethyl, chloroethyl, gamma-chloropropyl, bromo-propyl, 3,3,3-trifluoropropyl, perfluorovinyl, chlorocyclohexyl, bromocyclohexenyl, chlorophenyl, α,α,α-trifluorotolyl and β-chlorophenylpropyl.

A can also be any hydrolyzable group* such as halogen such as Cl, Br or F; hydrocarbonoxy such as methoxy, ethoxy, isopropoxy, octadecyloxy, β-methoxyethoxy, allyloxy, —O(CH$_2$CH$_2$O)$_2$C$_2$H$_5$ or phenoxy; halogenated hydrocarbonoxy such as chloroethoxy, bromophenoxy, chlorocyclohexyloxy or chlorobenzyloxy; acyloxy radicals such as acetoxy, benzoyloxy, acrylyloxy or chloroacetoxy; $R_2C=NO-$ radicals such as $(CH_3)_2C=NO-$,

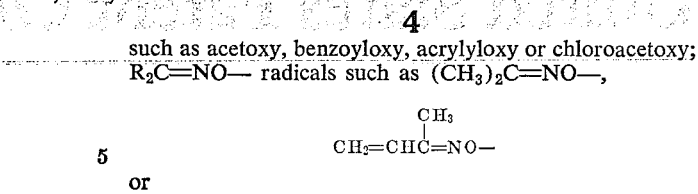

aminoxy radicals such as $(CH_3)_2NO-$ or $$\underset{C_6H_5NO}{\overset{CH_3}{|}}$$

amino radicals such as $(CH_3)_2N-$ or $(C_2H_5)_2N-$; $-C\equiv N$, $-N=C=O$, $-NH_2$, sulfate radicals of the formula $-OSO_2OR$ where R is H, methyl, ethyl or phenyl and sulfonate radicals such as $$-O\overset{O_2}{\underset{|}{S}}R$$

where R is phenyl or alkyl.

The compositions of this invention are useful as antioxidants for siloxane fluids and as additives for hydrocarbon oils to increase the lubricity under high pressure. The compounds of this invention offer a wide variety of selectivity in that one can adjust the solubility of the sulfide to fit the base materials by selecting the proper substituent R group on the silicon atom and for the substituent R″ group on the carbon atom.

The following examples are illustrative only and should not be construed as limiting the invention which is properly delineated in the appended claims.

EXAMPLE 1

0.125 m. of $(CH_3)_3SiCH_2SCH_3$ was dissolved in 200 ml. of dry tetrahydrofuran and cooled to —25° C., 0.125 m. of n-butyllithium in 100 ml. of hexane was added slowly with stirring. The solution was warmed to room-temperature and 0.15 m. of trimethylchlorosilane was added. The crude reaction product was extracted with diethylether and then washed with water until neutral and dried. The product was separated by gas liquid chromotagraphy and the compounds $\{(CH_3)_3Si\}_2CHSCH_3$ and $\{(CH_3)_3Si\}_3CSCH_3$ were both obtained. The product were identified by nuclear magnetic resonance spectra, elemental analysis and mass spectrographic analysis. The properties for $\{(CH_3)_3Si\}_2CHSCH_3$ were boiling point 41.5° C. at .5 mm., $n_D^{25}$ 1.4680, $D_4^{25}$ 0.864 and $R_D$ observed 0.3217 and calculated 0.3208. The compound $$\{(CH_3)_3Si\}_3CSCH_3$$

had a melting point of 130° to 135° C.

The compound having 3 silyl groups was formed by the in situ trans metallation of the $\{(CH_3)_3Si\}_2CHSCH_3$ by the intermediate

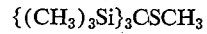

EXAMPLE 2

The compound

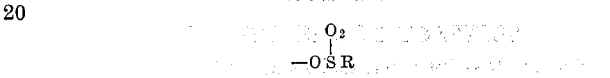

was prepared as shown in applicant's aforesaid copending application. When this compound is reacted with

---

* The term "hydrolyzable" means that the group is removed from the Si by water at room temperature.

in accordance with the procedure of Example 1 the compound

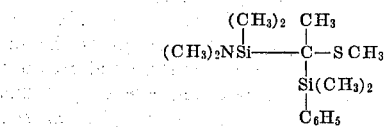

is obtained.

When this compound is hydrolyzed in the presence of .1% acetic acid solution in water and thereafter allowed to condense the disiloxane

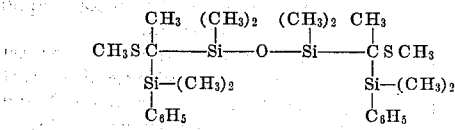

is obtained.

EXAMPLE 3

When the compound

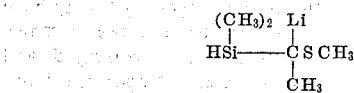

is reacted with H(CH₃)₂SiCl in accordance with the procedures of Example 1,

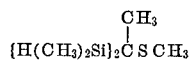

is obtained.

When the latter compound is reacted with water at 25° to 30° C. in the presence of palladium on charcoal at a pH of from 7.6 to 6.8, the diol

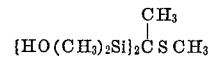

is obtained.

When this diol is condensed by heating to 100° C. in the presence of sodium phenoxide as a catalyst a fluid siloxane of the unit formula

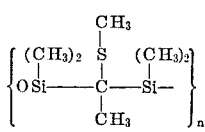

is obtained.

EXAMPLE 4

When the following Li compounds are reacted with the following chloro- compounds in accordance with the procedure of Example 1, the following compounds are obtained:

| Li compound | Chloro compound | Product |
|---|---|---|
| (CH₃)₂<br>C₁₈H₃₇Si———CHS C₁₈H₃₇ | O(≈H₃.₂NO₃Si≈1 | (CH₃.₂<br>≈₅fH₃₇Si—CHS≈₅fH₃₇<br>SiON(≈H₃.₂O₃ |
| (CH₃)₂<br>C₆H₅CHCH₂SiCHSC₆H₅<br>CH₃   Li | CH₃<br>O<br>S   Si≈1<br>CH₃ | (CH₃.₂<br>C₆H₅≈H≈H₂Si—≈A¶C₆H₅<br>CH₃<br>Si   O   CH₃<br>S |
| Li<br>}(CH₃.₃Si}₂CS≈H₃ | C₆H₅≈l | C₆H₅<br>{(CH₃.₃Si}₂≈S≈H₃ |
| Li<br>{(CH₃.₃Si}₂CS≈H₃ | C₅fH₃₇≈l | C₅fH₃₇<br>{(≈H₃.₃Si}₂—C—S—≈H₃ |
| Li<br>{(CH₃)₃Si}₂CSCH₃ | C₆H₁₁Cl | C₆H₁₁<br>{(CH₃)₂Si}₂—C—SCH₃ |
| Li<br>{(CH₃)₃Si}₂CSCH₃ | C₆H₅CH₂Cl | {(CH₃)₂Si}₂C—SCH₃<br>CH₂<br>C₆H₅ |

EXAMPLE 5

When the following silanes are hydrolyzed and/or cohydrolyzed and condensed the following siloxanes are obtained:

EXAMPLE 6

When 1 mole of $\{(CH_3)_2\underset{OH}{\overset{|}{Si}}\}_2CHSCH_3$

| Silane 1 | Silane 2 | Siloxane |
|---|---|---|
| $\underset{Si\{N(CH_3)_2\}_3}{C_{18}H_{37}\overset{(CH_3)_2}{\overset{|}{Si}}CHSC_{18}H_{37}}$ | ---------- | $C_{18}H_{37}\overset{(CH_3)_2}{\overset{|}{Si}}\underset{S-C_{18}H_{37}}{CHSiO_{3/2}}$ |
| $\{C_6H_5\overset{CH_3}{\overset{|}{C}H}\overset{(CH_3)_2}{\overset{|}{C}H_2Si-}\}_2-\underset{Si\{N(CH_3)_3\}_2}{CSC_6H_5}$ | ---------- | $\{C_6H_5\overset{CH_3}{\overset{|}{C}H}\overset{(CH_3)_2}{\overset{|}{C}H_2Si-}\}_2-\underset{\underset{C_6H_5}{\overset{|}{S}}}{\overset{\overset{S}{\bigcirc}}{C}SiO}$ |
|  | ---------- |  |
| $\{(CH_3)_3Si\}_2CSCH_3$ $\underset{(CH_3)_2}{\overset{SiN(CH_3)_2}{\|}}$ | $(CH_3)_2Si\{N(CH_3)_2\}_2$ | $\{(CH_3)_3Si\}_2\overset{CH_3}{\overset{\|}{\underset{\|}{S}}}CSiO_{.5}$ and $(CH_3)_2SiO$ |
| $(CH_3)_2\overset{OH}{\overset{\|}{Si}}-\overset{CH_3}{\overset{\|}{\underset{\|}{S}}}\overset{OH}{\overset{\|}{C}H-Si(CH_3)_2}$ | $(C_6H_5)_2Si(OOCCH_3)_2$ | $(CH_3)_2\overset{O_{.5}}{\overset{\|}{Si}}-\overset{CH_3}{\overset{\|}{\underset{\|}{S}}}\overset{O_{.5}}{\overset{\|}{C}H-Si(CH_3)_2}$ and $(C_6H_5)_2SiO$ |
| $\{(CH_3)_2N\overset{(CH_3)_2}{\overset{\|}{Si}}\}_3CSCH_3$ | $\overset{(CH_3)_2}{\overset{\|}{CH_2=CHSiN(CH_3)_2}}$ $C_{18}H_{37}Si\{N(CH_3)_2\}_3$ $ClC_6H_4\overset{CH_3}{\overset{\|}{Si}\{N(CH_3)_2\}_3}$ | $\{_{0.5}\overset{(CH_3)_2}{\overset{\|}{Si}}\}_3CSCH_3,$ $C_{18}H_{37}SiO_{3/2}$ $ClC_6H_4\overset{CH_3}{\overset{\|}{Si}O}$ and $\overset{(CH_3)_2}{\overset{\|}{CH_2=CHSiO_{.5}}}$ |
| $\{(CH_3)_3Si\}_2\underset{(CH_3)_2}{\overset{CSCH_3}{\overset{\|}{SiN(CH_3)_2}}}$ | $Si(OC_2H_5)_4$ | $\{(CH_3)_3Si\}_2\overset{CH_3}{\overset{\|}{\underset{\|}{S}}}CSiO_{.5}$ and $SiO_2$ |
| $\{HO\overset{(CH_3)_2}{\overset{\|}{Si}}\}_3CSCH_3$ | $CF_3CH_2CH_2\overset{CH_3}{\overset{\|}{Si}(OOCCH_3)_2}$ | $\{_{0.5}\overset{(CH_3)_2}{\overset{\|}{Si}}\}_3CSCH_3$ and $CF_3CH_2CH_2\overset{CH_3}{\overset{\|}{Si}O}$ |
| $\{(CH_3)_2N\overset{(CH_3)_2}{\overset{\|}{Si}}\}_3CSCH_3$ | $H\overset{CH_3}{\overset{\|}{Si}}\{N(CH_3)_2\}_2$ $\langle S\rangle-Si\{N(CH_3)_2\}_3$ $C_6H_5CHCH_2Si\{N(CH_3)_2\}_3$ $\overset{\|}{CH_3}$ | $\{_{0.5}\overset{(CH_3)_2}{\overset{\|}{Si}}\}_3CSCH_3$ $H(CH_3)SiO$ $\langle S\rangle SiO_{3/2}$ and $C_6H_5CHCH_2SiO_{3/2}$ $\overset{\|}{CH_3}$ |

is reacted with 2 mols of $(CH_3)_2Si(OOCCH_3)_2$ at 50° C. a compound of the average formula

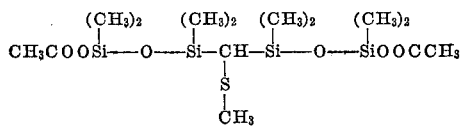

is obtained.

That which is claimed is:

1. A silane of the formula

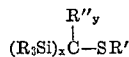

in which $x$ is an integer from 2 to 3 inclusive,
$y$ is an integer from 0 to 1 inclusive,
R is a hydrocarbon radical free of aliphatic unsaturation, a hydrogen atom, a hydroxyl group, or the radical $-NX_2$ in which
$X_2$ is an alkyl radical,
R″ is a hydrocarbon radical free of aliphatic unsaturation or the hydrogen atom and
R′ is an alkyl radical or a phenyl radical.

2. A siloxane having at least one unit of the formula

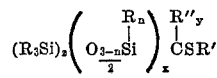

in which $x$ is an integer from 1 to 3 inclusive,
$z$ is an integer from 1 to 2 inclusive,
$y$ is an integer from 0 to 1 inclusive,
$n$ is an integer from 0 to 2 inclusive, the sum of $x+z$ being at least 2 and the sum of $x+y+z$ being no greater than 3,
R is a hydrocarbon radical free of aliphatic unsaturation, the hydrogen atom, the hydroxyl group or $-NX_2$ in which
X is an alkyl radical,
R″ is a hydrocarbon radical free of aliphatic unsaturation or a hydrogen atom,
R′ is an alkyl radical or a phenyl radical, any remaining siloxane units being of the formula

in which A is a hydrolyzable group, a hydrogen atom, a hydroxyl group, a hydrocarbon radical or a halohydrocarbon radical, and
$m$ has an average value from 0 to 3 inclusive.

References Cited

UNITED STATES PATENTS 2,960,492  11/1960  Morton et al. ___ 260—448.2XR
3,078,292  2/1963  Prober _____ 260—448.2(N)

TOBIAS E. LEVOW, Primary Examiner

P. F. SHAVER, Assistant Examiner

U.S. Cl. X.R.

252—46.3, 400; 260—37, 46.5